Oct. 28, 1952     A. R. BLACKBURN ET AL     2,615,229
MOLD AND METHOD OF MAKING MOLDS
Filed Nov. 12, 1948     2 SHEETS—SHEET 1
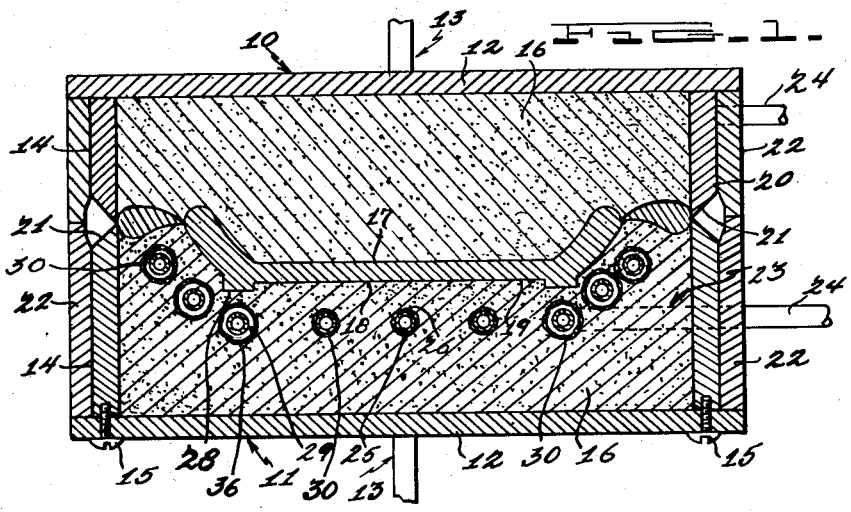
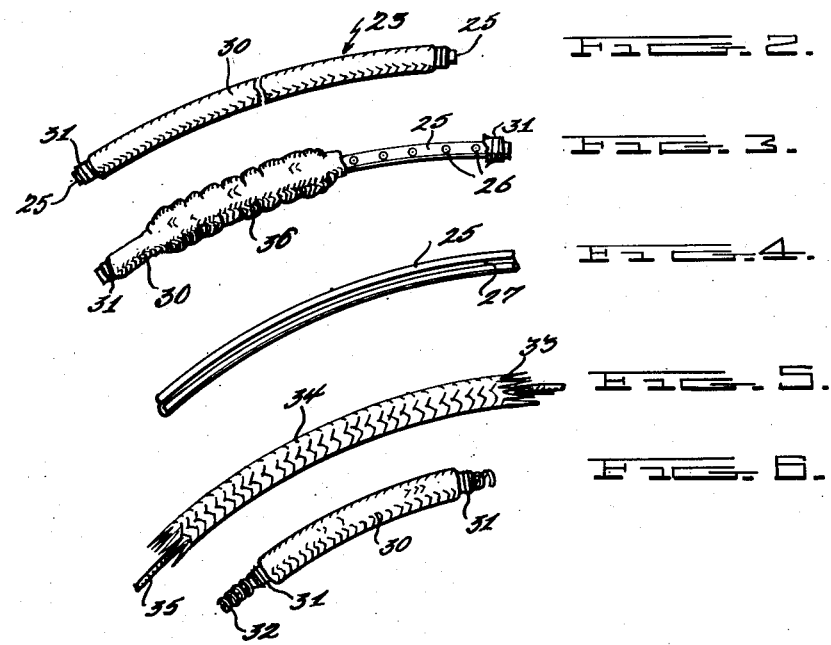
Inventors
RICHARD E. STEELE
ANDREW R. BLACKBURN
By
Semmes, Keegin, Robinson & Semmes
ATTORNEYS Oct. 28, 1952     A. R. BLACKBURN ET AL     2,615,229
MOLD AND METHOD OF MAKING MOLDS
Filed Nov. 12, 1948                        2 SHEETS—SHEET 2
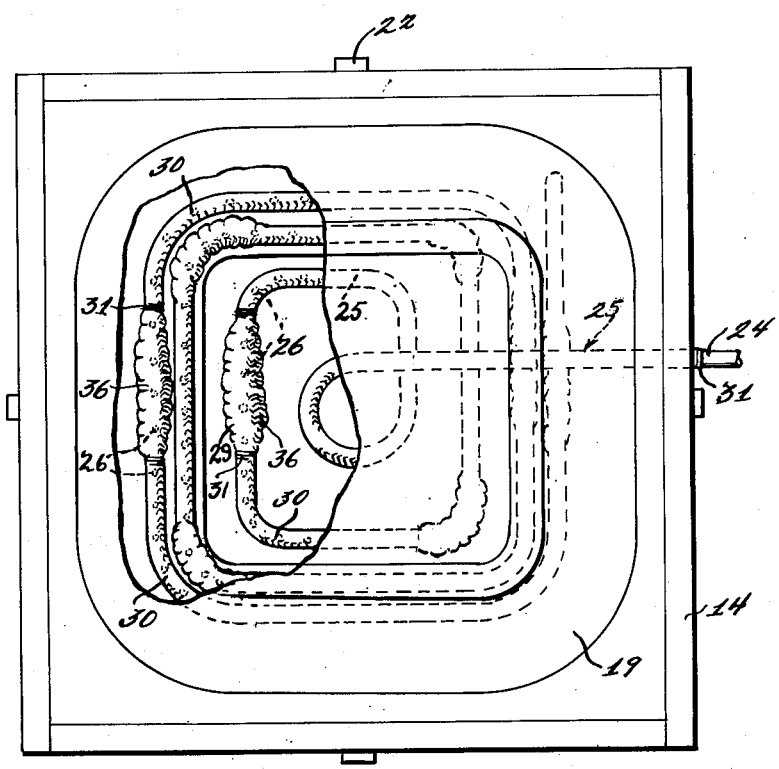
Inventors
RICHARD E. STEELE
ANDREW R. BLACKBURN
By
Semmes, Keegin, Robinson & Semmes
ATTORNEYS Patented Oct. 28, 1952

2,615,229

UNITED STATES PATENT OFFICE 2,615,229

MOLD AND METHOD OF MAKING MOLDS

Andrew R. Blackburn and Richard E. Steele, Columbus, Ohio, assignors to Ram, Inc., Detroit, Mich.

Application November 12, 1948, Serial No. 59,492

8 Claims. (Cl. 25—129)

The present invention relates to molds and methods of forming molds for use in the manufacture of ceramic ware, and has particular reference to improvements in porous molds of the type embodying conduit means embedded in the body of the mold for carrying fluid pressures to the mold face to effect the separation of the molded object from the faces of the molds immediately upon formation and independently of ware shrinkage.

The present invention is an improvement on the mold and method of manufacture disclosed and claimed in application Serial No. 737,544, entitled Mold and Method of Making Same, filed March 27, 1947 by Andrew R. Blackburn and Richard E. Steele relating specifically to improvements in the fluid pressure conduits embedded in the porous mold.

Air release molds of the type disclosed in the above-identified application for patent are adapted for continuous use in assembly line ware forming operation. Due to wear on the mold face, it is necessary to reform the mold in order to maintain the quality of the ware. In reformation of the mold, it has been found that the air release tubing embedded in the porous body of the mold may become damaged to an extent preventing reuse of the tubing adding considerably to the cost of each mold unit.

With regard to the completed molds, effective separation of the ware from the mold face is dependent in great degree upon careful control of the fluid pressure impressed on the ware at critical points of separation from the mold.

The invention has for an object the provision of a porous mold structure provided with novel conduit means for distributing fluid pressure over desired portions of the face of the mold, to separate formed ware from the mold faces.

A further object is to provide a mold for use in high speed production of ceramic ware, the mold being available for reuse immediately subsequent to forming the clay object, markedly reducing the number of molds necessary to operate a ceramic ware production line.

A further object is to provide an inexpensive, replaceable fluid pressure conduit for emplacement within the porous mold base, capable of providing fluid pressure in desired controlled amount at the faces of the molds to effect release of the ware from the mold face, the conduit being formed with means adjustable to provide varying degrees of fluid pressure flow at desired critical points of ware contact on the mold face, thereby effecting separation of the ware without deformation or breakage of the most delicate pieces of ware.

A further object is to provide a novel method of forming a mold body embodying a fluid pressure conduit embedded in a porous mold base.

A further object is to provide a conduit member for use in forming porous molds embodying the air release principle, which may be reshaped for reuse in successive mold bodies, and which is provided with means for adjusting and controlling the flow of fluid pressure to the face of the mold at any point along the length of the conduit.

Other objects and advantages of the invention will be apparent from the following detailed description thereof, and accompanying drawings, wherein:

Figure 1 is a vertical section of one form of mold assembly embodying the present invention;

Figure 2 is a perspective view of one form of fluid pressure conduit for use with the invention;

Figure 3 is a perspective view of a further form of conduit;

Figure 4 is a perspective view of yet another form of conduit;

Figures 5 and 6 are perspective views of further embodiments of conduits which may be employed; and Figure 7 is a plan view, partially broken away, of the invention.

In its broadest application, the invention embodies the provision of novel fluid conduit means for inclusion in the body portion of a porous mold to be employed in the manufacture of ceramic ware. The fluid conduit members normally are positioned in the mold body so as to follow in spaced, parallel relationship the contour of the molding surface impressed on the mold face, whereby upon the application of fluid pressures to the conduit, a blanket of fluid pressure emerges in controlled amount from the mold body adjacent the mold face to separate the formed ware from the mold. Molds formed in accordance with the present invention are constructed to provide for a more effective and minute degree of control of the amount of fluid pressure impressed upon a selected portion of the molded object, whereby cracking or deformation of the molded object during the removal step is avoided. The pressure conduits of the invention are so constructed that they may be modified in cross sectional area by the mold maker during assembly of the mold to provide a desired fluid pressure at a preselected point or points on the body of the ware. Accordingly, it will be seen that the pressure conduits of the invention may be constructed by the mold maker in accordance with predetermined pressure release requirements for a particular piece of ware, and then reformed and readjusted for use in another mold.

The invention also contemplates the provision of fluid pressure conduits formed of inexpensive materials which may be disposed of after use without appreciably affecting the cost per unit of the completed molds.

The term "fluid pressure" is used hereinafter in its broad sense, embodying the use of air or hydraulic pressure. For purposes of description, however, the invention will be described in connection with the use of air pressure in effecting the quick release of ware from the mold surfaces.

Referring to the drawings, there is shown in Figure 1 an exemplary form of mold comprising male and female mold sections indicated generally as 10 and 11, each section having a base plate 12 supported by a member 13 such as a hydraulic plunger for effecting relative movement of the mold sections. The plates 12 support mold rings 14 secured thereto by screws 15 or otherwise. Each mold section is formed with a mold body 16 composed of a porous material characterized by extreme hardness such as a high grade plaster of Paris. The mold bodies 16 are formed with male and female forming faces 17 and 18 receiving a body of plastic clay 19 to be shaped as ware. An excess clay collecting cavity 20 may be provided, the opposed mold rings 14 also being provided with knife edges 21 for cutting off excess clay exuding from between the mold faces and through the cavity 20, whereby clogging of the molds is avoided. If desired, stop members 22 may be provided adjacent the mold rings 14, to prevent the application of excess pressures on the opposed molds in a ware forming operation.

One or both of the molds 10 and 11 are provided with fluid pressure means comprising a pressure conduit 23 spaced apart from and parallel to the plane of the impression contour on the faces 17 and 18 of the molds. The conduit 23 extends through the mold ring 14 at 24 for connection with a source of fluid pressure not shown providing a positive pressure or a vacuum pressure in the conduit 23, as desired. It will be seen that the conduit 23 is positioned with relation to the face of the porous mold body as to provide a fluid pressure of predetermined strength emanating from the entire mold face adjacent the ware formed on the mold, upon the application of fluid pressure. The conduit 23 is positioned by the mold maker during construction of the mold whereby a desired fluid pressure is provided at points on the mold face and correlatively on the face of the adjacent clay object, the points being selected in accordance with the points of relative structural strength of the clay object.

In accordance with the present invention, means are provided for accomplishing a fine degree of control of the flow of fluid pressure from the conduit 23 to the faces 17 and 18 of the molds, at all points along the length of the conduit 23. As shown in Figures 2 and 3, in one embodiment of the invention, the conduit 23 may comprise a tubular member 25 which is perforated along its length as at 26 for the escape of fluid pressure into the porous mold, or may be formed with a continuous slot or open seam 27, as shown in Figure 4. The tubular member 25 preferably is positioned in the porous mold body so that the perforations 26 or open seam 27 open towards a desired portion of the ware nearest the tube 25, thereby assisting in the direction of the flow of pressure. As shown best in Figure 1, the fluid pressure preferably is directed at the stronger portions of the ware 19 such as the ware base 28, capable of receiving the force of the fluid pressure without fracture, or deformation.

To assist in the release and control of the flow of the fluid pressure from the conduit 23 into and through the porous mold bodies to the mold faces, novel means are provided to form a pressure chamber 29 of cross sectional area greater than that of the conduit 23 in the mold bodies around the conduits 23 and along the length thereof. The chamber forming means preferably may comprise a member expansible and contractible longitudinally of the conduits 23 whereby the cross sectional area of the chamber defined by the member is correspondingly decreased and increased, forming a pressure chamber of desired cross sectional area around the conduit 23 in the mold body. Adjustment of the chamber forming means is accomplished by the mold maker, during the formation of the mold, as the gypsum or other material employed in forming the mold is being put into the mold casing.

A preferred embodiment of pressure chamber forming means is shown in Figures 2, 3 and 6 of the drawings, and comprises a tubular sleeve 30 superimposed over the length of the tube 25 and movable longitudinally of the tube. The sleeve 30 may be formed of a porous, resilient material such as a fabric of relatively tight, flexible weave, having sufficient body in expanded or contracted position to withstand distortion or compression by the weight of the plaster forming the mold body, maintaining the cross sectional area desired. The tubular sleeve 30 may preferably be formed of chemically resistant fibers or threads such as glass or rayon, and may be of a length equal to the length of the tube 25 or consistent with the particular pressure release requirements of the mold. The sleeve 30 may be secured at terminal portions and at points along the length thereof by suitable bindings 31, which permit of movement of any desired portion of the sleeve relative to the tube 25, whereby adjustment of the sleeve is accomplished.

As shown in Figure 2, when it is desired that the pressure chamber 29 be of reduced cross section approaching the cross sectional area of the tube 25, the sleeve bindings 31 defining the enlarged section of the sleeve are moved away from each other to draw the sleeve 30 in on the tube 25. Movement of the sleeve bindings 31 inwardly expands and simultaneously compacts and stiffens the sleeve 30 as shown in Figure 3, providing a pressure chamber 29 of increased cross sectional area around a desired portion of the tube 25.

Referring to Figure 6, in cases where the molds have to be reformed frequently, it has been found that the conduit 23 may advantageously comprise a resilient coil of wire 32 which may temporarily be deformed by the mold maker in accordance with the requirements of a particular mold forming procedure, the wire coil 32 returning to normal shape when the mold is broken up. In this case, it is preferred that the sleeve 30 extend the full length of the coil 32.

A dispensible form of conduit 23 which may be manufactured inexpensively is shown in Figure 5. The conduit 23 embodies a rope 33 of loose fibrous material such as cotton batten, secured by a loosely woven net 34, the rope 33 preferably being formed around a supporting wire 35 forming a relatively rigid core member, assisting in formation of the conduit 23 into a desired shape. The diameter of the rope may be modified simply by stretching or compacting the member as it is emplaced in the soft plaster body of the mold prior to hardening.

Application of the principles of the invention to a mold section for the formation of an approximately square clay dish is shown in Figure 7, employing the perforated tube 25 as the fluid pressure conduit. It will be noted that the sleeve 30 is shown as expanded or bunched at 36 on desired portions of the tube 25 which may be adjacent the corners or at other selected portions of the dish 19. The enlarged cross sectional area of the fluid pressure chamber around the tube 25 in these expanded sections 36 results in an increased fluid pressure being impressed on these particular portions of the ware to effect the separation thereof from the mold face. A minimum of pressure is applied to the relatively weak portions of the dish more readily deformed or cracked by the pressure, by those sections of the tube 25 where the sleeve is expanded along its length flush with the tube surface to provide a pressure chamber 29 of minimum cross sectional area. A further type of sleeve arrangement is shown in Figure 1 of the drawings wherein a minimum of pressure is exerted against the bottom center portion of the wire.

Formation of the molds may be accomplished in accordance with the method disclosed in application Serial No. 737,544.

It will be observed that the present invention permits of use of the pressure release principle in the manufacture of the most delicately formed pieces of ware, by providing means for affecting a fine degree of control over the application of fluid pressure to selected portions of the ware. In addition, the pressure conduits of the invention are protected against the introduction of small pieces of solid matter into the pressure conduits, which might tend to clog the conduits, when a vacuum is applied to the conduits. The invention also provides an inexpensively formed pressure release conduit, which may be used repeatedly in mold forming operations, or which may be discarded without appreciably increasing the cost per mold. It will be apparent that the invention may be practiced in the manufacture of ware of any shape or size, and in connection with any mold embodying a porous base.

It will be apparent that obvious substitutions of materials may be made without departing from the spirit of the invention, which is to be limited only as defined in the appended claims.

We claim:

1. In a mold for use in the formation of ware, a porous mold body and means in the mold body for supplying fluid pressure at the face of the mold to effect release of the formed ware comprising a flexible, porous conduit embedded in the porous mold body of varying cross-sectional area at selected points along its length to control the amount of fluid pressure delivered through the porous mold body to the mold face at said selected points along the length of the conduit.

2. In a mold for use in the formation of ware, a porous mold body and means in the mold body for supplying fluid pressure at the face of the mold to effect release of the formed ware comprising an expansible and contractible conduit embedded in the porous mold body in spaced relationship with the face of the mold, said conduit having a cross-section area varying at selected points along the length of the conduit to control the amount of fluid pressure delivered through the mold body to points on the porous mold face opposite the said modified sections of the conduit.

3. In a porous mold for use in the formation of ceramic ware, a porous mold body and means for supplying fluid pressure at the face of the mold comprising an apertured tube in the porous mold body for receiving and dispersing fluid pressure through the mold body to the mold face, and a permeable cover member having a cross-section varying along its length enveloping the tube and forming a fluid pressure chamber between the surface of the tube and the surrounding porous mold body.

4. In a porous mold for use in the formation of a ceramic ware, a porous mold body and means for supplying fluid pressure at the face of the mold comprising a tubular conduit in the porous mold body for receiving and apertured for dispersing fluid pressure through the mold body to the mold face, and a woven fabric sleeve on the conduit, said woven fabric sleeve having a non-uniform diameter to form a pressure chamber of desired cross sectional area between the surface of the tubular conduit and the porous mold body adjacent the conduit whereby the fluid pressure directed to selected points along the face of the mold is controlled.

5. In a mold for use in the manufacture of ceramic ware, a porous mold body and a fluid pressure conduit embedded in the mold body for effecting the pressure release of ware from the mold body comprising a tubular member apertured along its length for the release of fluid pressure in the mold body, and a woven fabric sleeve of non-uniform diameter on the tubular member forming a chamber of non-uniform diameter around the tubular member within the mold body.

6. A method of incorporating a fluid pressure conduit in the body of a porous mold of plastic material while in the plastic state comprising shaping the conduit to parallel roughly the surface contours of the object to be molded, modifying the cross sectional area of the shaped conduit at selected points along its length to increase the surface area of the conduit in contact with the porous mold body at spaced points, incorporating the shaped conduit in the plastic mold body, impressing a molding contour on the surface of the plastic body in spaced relationship with the conduit, and hardening the mold body.

7. A method of forming a fluid pressure conduit within the body of a porous mold for purposes of supplying controlled fluid pressure across the face of the mold to release a piece of formed ware therefrom, comprising shaping the conduit as a coiled member conforming generally to the surface contours of the object to be molded, enlarging the cross-sectional area of the conduit at selected points along its length wherein it is desired to apply locally an increased fluid pressure to the mold face to assist in ware removal, forming a plastic mix of mold forming material, incorporating the preformed fluid pressure conduit in the plastic material, impressing a molding contour on the surface of the plastic material in spaced relationship with the conduit with selected localized areas of the molding contour being positioned directly over the portion of the conduit having enlarged cross-sectional areas whereby an increased fluid pressure is directed through the porous mold body to the said localized areas, and hardening the mold.

8. A method of forming a fluid pressure conduit within the body of a porous mold for purposes of supplying controlled fluid pressure across the face of the mold to release a piece of formed ware therefrom comprising shaping an apertured conduit having a sleeve of porous material compressible longitudinally to form a sleeve of increased diameter thereon as a coiled member conforming generally to the surface contours of the object to be molded, longitudinally compressing the sleeve at selected points along its length wherein it is desired to apply locally an increased fluid pressure to the mold face to assist in ware removal, securing the sleeve to the conduit at the extremities of the compressed portions to fix the position of the compressed portions on the conduit, forming a mold body of a plastic mix of mold forming material, incorporating the preformed fluid pressure conduit in the mold body while the mold forming material is in a plastic condition, shaping the surface of the mold body in spaced relationship with the conduit with selected localized areas of the molding contour being positioned directly over the longitudinally compressed portions of the conduit whereby an increased fluid pressure may be directed through the porous mold body to the said localized areas, and hardening the mold body.

ANDREW R. BLACKBURN.
RICHARD E. STEELE.

REFERENCES CITED

The following references are of record in the file of this patent:

UNITED STATES PATENTS

| Number | Name | Date |
|---|---|---|
| 1,566,903 | Durst | Dec. 22, 1925 |
| 1,592,536 | O'Neill | July 13, 1926 |
| 1,605,782 | Rota | Nov. 2, 1926 |
| 1,717,996 | Moore, Jr. | June 18, 1929 |
| 1,811,950 | Meacham | June 30, 1931 |
| 1,898,043 | Foster | Feb. 21, 1933 |
| 2,299,520 | Yant | Oct. 20, 1942 |
| 2,340,794 | Chernack | Feb. 1, 1944 |
| 2,366,435 | Brown | Jan. 2, 1945 |
| 2,434,780 | Wiss et al. | Jan. 20, 1948 |
| 2,495,119 | McDevitt | Jan. 17, 1950 |